United States Patent [19]

Dach et al.

[11] Patent Number: 4,773,283
[45] Date of Patent: Sep. 27, 1988

[54] INFINITELY VARIABLE COMPOUND TRANSMISSION

[75] Inventors: Hansjörg Dach; Karlheinz Schachmann, both of Friedrichshafen; Anton Ott, Tettnang, all of Fed. Rep. of Germany

[73] Assignee: Zahnradfabrik Friedrichshafen AG, Friedrichshafen, Fed. Rep. of Germany

[21] Appl. No.: 9,557

[22] Filed: Jan. 30, 1987

Related U.S. Application Data

[63] Continuation of Ser. No. 684,335, filed as PCT EP83/00134 on May 28, 1983, published as WO84/04144 on Oct. 25, 1984, abandoned.

[30] Foreign Application Priority Data

Apr. 13, 1983 [WO] PCT Int'l Appl. .......... PCT/DE83/00053

[51] Int. Cl.⁴ .......................................... F16H 47/08
[52] U.S. Cl. ...................... 74/688; 74/677; 74/732
[58] Field of Search .............. 74/689, 688, 730, 677, 74/745, 740, 731; 192/3.22, 3.23, 3.24; 474/11, 12, 18, 28, 70

[56] References Cited

U.S. PATENT DOCUMENTS

| | | | |
|---|---|---|---|
| 1,960,705 | 5/1934 | Kochling | 192/3.24 |
| 2,448,678 | 9/1948 | McFarland | 192/3.22 X |
| 2,670,823 | 3/1954 | Thurber | 192/3.22 |
| 2,964,975 | 12/1960 | De Lorean | 192/3.23 X |
| 3,019,670 | 2/1962 | Kelley | 192/3.22 X |
| 3,055,232 | 9/1962 | Dodge | 74/688 X |
| 3,187,512 | 6/1965 | Gabriel | 192/3.22 X |
| 3,202,018 | 8/1965 | Hilpert | 192/3.22 X |
| 3,270,585 | 9/1966 | Livezey | 74/688 X |
| 3,272,032 | 9/1966 | Smalinskas | 74/677 |
| 3,367,211 | 2/1968 | Borman et al. | 74/688 X |
| 3,435,707 | 4/1969 | De Julian | 74/688 X |
| 3,628,398 | 12/1971 | Chery | 74/688 |
| 4,125,037 | 3/1977 | Palmer et al. | 74/732 |
| 4,494,942 | 1/1985 | Hirano et al. | 474/18 X |

FOREIGN PATENT DOCUMENTS

| | | |
|---|---|---|
| 0061736 | 10/1982 | European Pat. Off. . |
| 743184 | 3/1933 | France . |
| 2947658 | 7/1981 | Fed. Rep. of Germany . |
| 2058251 | 4/1981 | United Kingdom . |

*Primary Examiner*—Leslie A. Braun
*Assistant Examiner*—James W. Innskeep
*Attorney, Agent, or Firm*—Herbert Dubno; Andrew Wilford

[57] ABSTRACT

An infinitely variable compound transmission has a tripartite hydrodynamic torque converter having a pump, a turbine member and a guide member relatively rotatable about a common axis. An input pump shaft normally driven by an engine is connected to the pump, a guide shaft is connected to the guide member and coaxial with the pump shaft, and a turbine shaft coaxial with the guide and pump shafts is connected to the turbine member. A brake connected to the turbine shaft is energizable for immobilizing the turbine shaft against rotation. A coupling clutch connected between the turbine shaft and the guide shaft is actuatable for joint rotation of same about the axis. A bypass clutch is actuatable for connecting the pump shaft to one of the members. An infinitely variable belt transmission operatively connected to the guide shaft has an output shaft connectable to a load. In a starting position, only the coupling clutch is actuated with the brake and bypass clutch unactuated for driving the turbine and guide shafts purely hydraulically. In a forward drive position, both the bypass and coupling clutches are actuated with the brake unactuated for positively coupling the guide shaft and the shaft of the one member. In a reverse starting and drive position, the brake is actuated with the clutches both unactuated for reverse driving the guide shaft purely hydraulically.

10 Claims, 2 Drawing Sheets

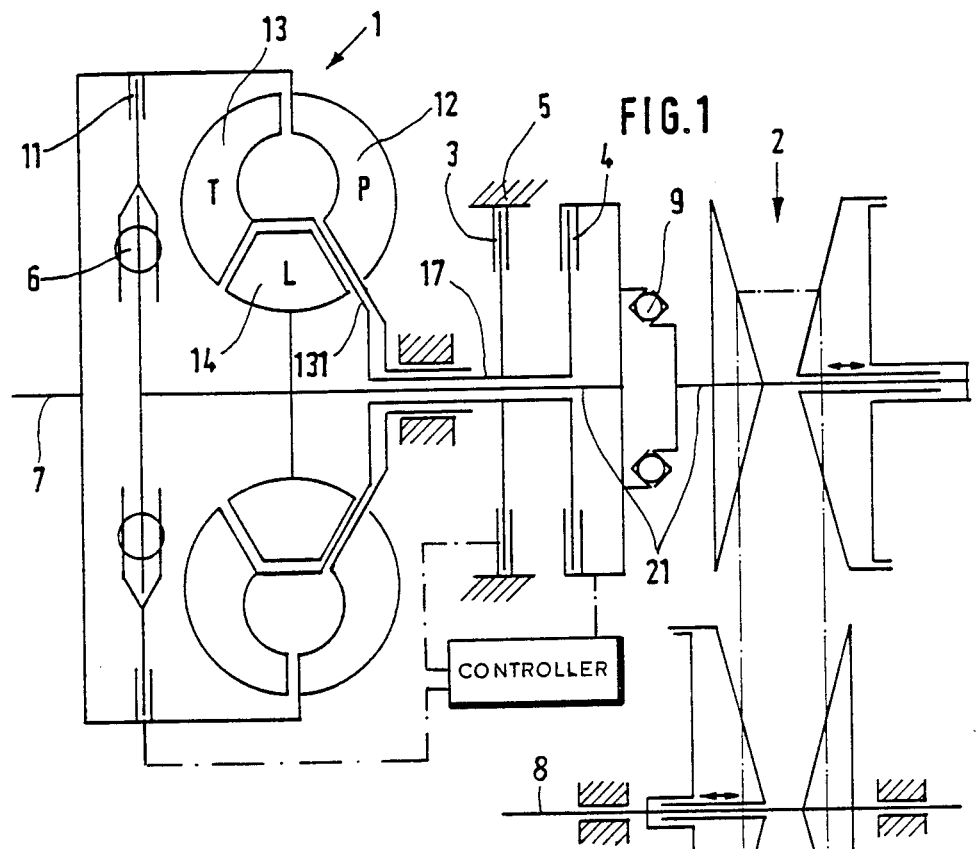
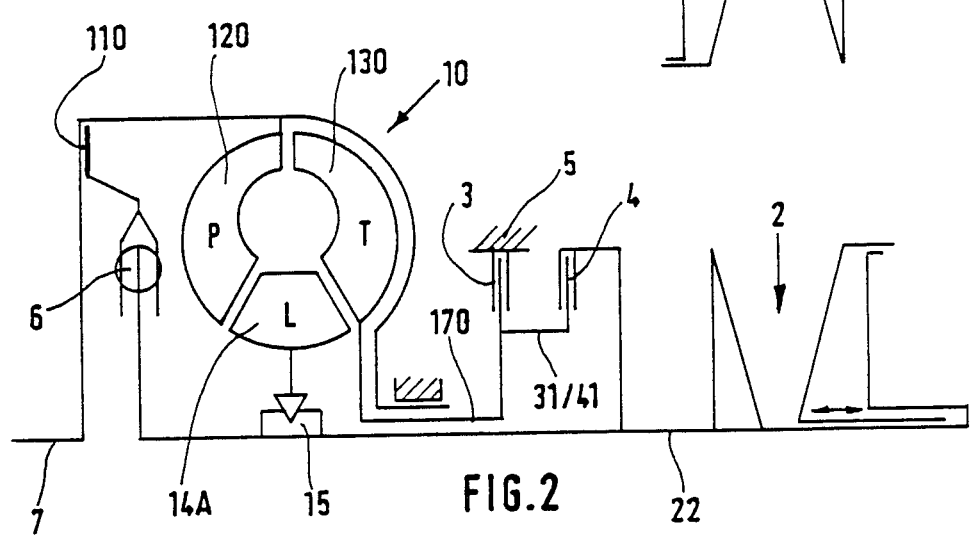

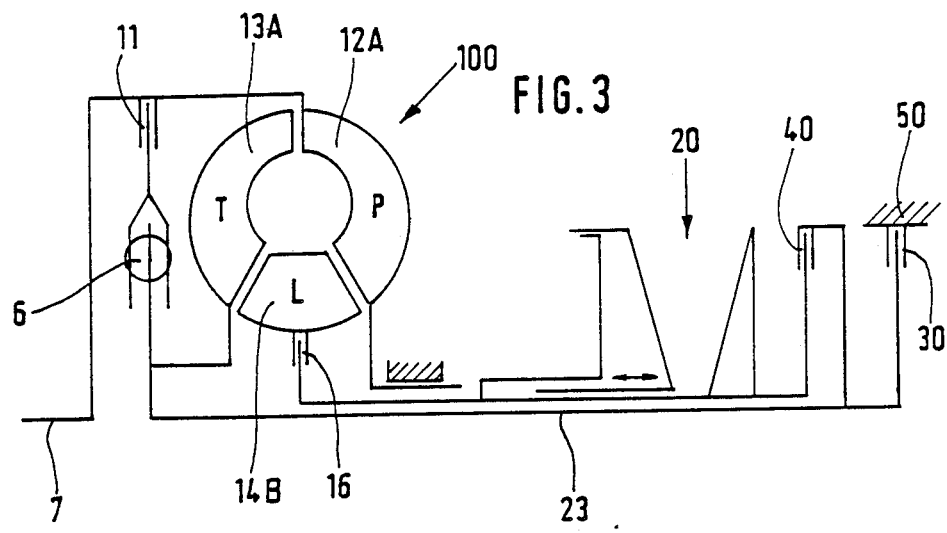
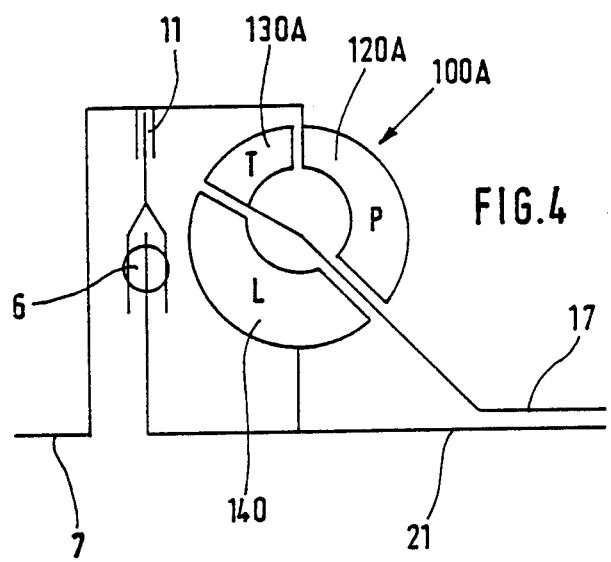

INFINITELY VARIABLE COMPOUND TRANSMISSION

CROSS REFERENCE TO RELATED APPLICATIONS

This is a continuation of co-pending application Ser. No. 684,335 filed as PCT EP83/00134 on May 28, 1983, published as WO84/04144 on Oct. 25, 1984, now abandoned.

This application is a national phase application corresponding to PCT EP 83/00134 filed May 28, 1983 and based upon an application in the Federal Republic of Germany of Apr. 13, 1983 under the International Convention.

FIELD OF THE INVENTION

The present invention relates to an infinitely variable compound transmission. More particularly this invention concerns such a transmission which can be manual or automatic and which includes a variable-pitch belt transmission.

BACKGROUND OF THE INVENTION

Transmissions of this type are known from German patent document No. 2,947,658 and U.S. Pat. No. 4,125,037. In both cases a transmission input shaft is permanently connected with the pump impeller of a hydrodynamic unit and may also be coupled via a bridging clutch with the drive shaft of a variable-pitch belt transmission. A direction-reversing transmission is connected to the output shaft of the belt transmission for direction reversal by means of a sliding sleeve, a jaw clutch, and gears or via a second jaw clutch and gears with an intermediate gear to the output shaft or to a differential for forward or backward movement. Such switchover requires a separate isolating clutch between the drive engine (upstream of the turbine) and the drive shaft of the mechanical stepless drive in order to interrupt the drive coming from the motor during reverse operation.

Transmissions of this type are very large and heavy and controlling them is particularly complicated as the large number of components make them heavy, and the manufacture of such transmissions involves high cost.

OBJECT OF THE INVENTION

It is, therefore, an object of this invention to provide a simpler compound transmission which is lighter in weight than the earlier transmission and enables the optimal and multiple use of the elements contained therein for all possibly functions.

This object is attained in accordance with the invention in an infinitely variable compound transmission with at least one tripartite hydrodynamic unit with a coordinated bridging clutch and a mechanical, infinitely variable transmission, as well as devices for forward drive and reversing, and a clutch located between the hydrodynamic unit and a mechanical, infinitely variable transmission wherein the variable torque conversion ensues preferably through the mechanical, infinitely variable transmission, and the reversal of rotation for forward driving and reversing is effected by the hydrodynamic unit.

While in the above-mentioned patent documents the hydrodynamic unit is used as a starting aid and for the torque conversion, and the reversal of rotation requires a separate transmission, the torque conversion according to the invention is effected in the mechanical, infinitely variable transmission, e.g., in the loop belt transmission, and the hydrodynamic unit is still used for the reversal of rotation, and the separate reversing transmission is no longer required.

The function of the turbine, which may be arranged in the vicinity of the transmission primary shaft or (as seen in axial direction) near the loop belt transmission, is modified between the forward starting range—which acts as a turbine—and the reverse starting and driving range —which acts as guide disk due to the support provided at the housing.

Due to the connection of the guide disk, which is radially attached at the inside with the drive shaft of the mechanical, infinitely variable transmission, the guide disk acts in principle as a turbine for the two driving ranges, so that in the forward driving range the hydrodynamic unit acts as a hydrodynamic clutch.

While, in accordance with the state of the art, as with all gear-shift transmissions, the hydrodynamic unit is supported by the guide disk at the housing via an overrunning device, said hydrodynamic unit is modified according to the invention to have multiple uses. In connection with the mechanical, infinitely variable transmission and the fact that in the greater part of the forward driving range the converter is bridged, the efficiency problems are of secondary importance.

Preferably the drive shaft of the mechanical, infinitely variable transmission linked via the guide disk and the turbine is optionally linkable via a brake with the housing or via a clutch with this drive shaft of the mechanical, infinitely variable transmission. The guide disk can be arranged to be torsionally stable on the drive shaft for the mechanical, infinitely variable transmission. The guide disk can be linked via a one-way clutch with the drive shaft for the mechanical, infinitely variable transmission. The guide disk can also be linked via a clutch with the drive shaft for the mechanical, infinitely variable transmission.

Thus the guide disk can have a torsionally stable linkage with the drive shaft of the mechanical, infinitely variable transmission, as well as via an overrunning device or a clutch, while the torsionally stable linkage is particularly simple, because no operating elements are required.

The two forward driving ranges are not subjected to any disadvantageous effects, as in this case only the turbine is enlarged, and in the bridged range the entire hydrodynamic unit rotates as a group.

The control of the bridging clutch is effected depending on the rotational speed, and the engagement of the bridging clutch is suppressed in the reverse driving range. The control of the bridging clutch can be effected in dependence on the torque. Moreover the forward and reverse driving ranges of the mechanical, infinitely variable transmission are so selected as to achieve a maximal torque transmission. The clutches and/or brakes are developed as jaw clutches with synchronizing mechanism.

If the jaw clutches are connected to a control means that is also connected to the brake and that is provided with a synchronizing mechanism, a further simplification is possible, which is particularly advantageous if the infinitely variable compound transmission is designed as a manually operated transmission.

The dampener can be arranged ahead of the mechanical, infinitely variable transmission, and is particularly advantageous to the bridged converter in the forward driving range, because it will, for instance, prevent the loop belt transmission from being subjected to hard shocks which affect the lifetime of the transmission. The transmission primary shaft can be via the bridging clutch and the guide disk with the driveshaft for the mechanical, infinitely variable transmission, and the pumps—and the guide disk—rotate jointly, while the turbine impeller is retained via the brake so that the hydrodynamic unit acts as a nonwearing hydrodynamic brake. This favorable arrangement of the hydrodynamic unit in connection with the clutches and the mechanical, infinitely variable transmission enables the use of a further non-wearing hydrodynamic brake, without requiring additional elements.

The hydrodynamic unit can have symmetrically arranged turbines and pump impeller, while the turbine is arranged in the vicinity of the transmission primary shaft and inserted between the pump impeller and guide disk in the form of a spoked wheel. The turbine impeller can be arranged in axial direction in the hydrodynamic unit between the pump impeller and the mechanical, infinitely variable transmission, and the pump and turbine impeller can be symmetrical. The turbine and the guide disk in the hydrodynamic unit can have radius proportions that are so developed that during forward driving and reversing the same torque is obtained. If, for instance, as here described, the turbine is developed with a reduced and the guide disk with an enlarged radius proportion, this will produce an improved characteristic curve for the reversing guide disk during operation in reverse gear.

A favorable matching of the clutch and brake, as well as of the dividing gears—like the arrangement between the dividing gears with a joint inner disk carrier—, leads to a further simplification.

From the German patent application DE-AS 10 69 001 a hydraulic torque converter is known which is used for obtaining the reverse gear. Yet the hydraulic torque converter is not followed by a mechanical, infinitely variable transmission, but a planetary transmission, and the reverse gear is obtained by jointly retaining the internal gear of the first gear assembly of the planetary transmission and the sun gear. The torque conversion also occurs exclusively in the hydraulic torque converter, which necessarily is optimized only for forward driving. Inspite of the clutch being engaged in second gear, the hydraulic torque converter is not bridged, but participates via the power division in the transmission of the engine torque—the drive at the internal and sun gear of the first gear assembly from the planetary transmission.

Further, a hydrodynamic unit is known from the French document FR-A No. 743 184, whereby the direction of rotation can be reversed. By arranging a large number of clutches and brakes, and due to the fact that they lock by varying degrees, it is possible to achieve various converter speed ratios as well as the speed reversal. Thus the speed reversal can be achieved by locking the brake at the guide disk and clutch between drive shaft and pump and turbine and output drive shaft.

The hydrodynamic unit is not linked with a mechanical transmission, and the object of application does not indicate any means whereby this can be achieved.

BRIEF DESCRIPTION OF THE DRAWING

Further details of the invention are explained with reference to the accompanying drawing in which FIG. 1 is a schematic drawing of an infinitely variable compound transmission with a tripartite hydrodynamic unit and a mechanical, infinitely variable transmission.

FIG. 2 is a schematic half section of an infinitely variable compound transmission with a different pump and turbine impeller arrangement and an overrunning device at the guide disk.

FIG. 3 is an infinitely variable compound transmission according to FIG. 2 with a different turbine suspension and with clutches at the guide disk.

FIG. 4 is a detail from FIG. 1, referring to the tripartite hydrodynamic unit, which does not have symmetrically arranged radius proportions between pump and turbine.

SPECIFIC DESCRIPTION

The infinitely variable compound transmission illustrated in FIG. 1 is equipped with a tripartite hydrodynamic unit 1, whose pump impeller 12 is driven via a transmission primary shaft 7. By means of a bridging clutch 11 the primary shaft 7 can be linked via a dampener 6, which acts in circumferential direction, directly with the drive shaft 21 of the mechanical, infinitely variable transmission 2, e.g. a belt transmission. The starting torque is transmitted via an output shaft 8, or, if necessary, a stable transmission, to the differential gear unit.

The tripartite hydrodynamic unit 1 is assembled similar to a trilok converter, yet the guide disk 14 is not, as is generally the case, supported via a single-way clutch at the housing, but rather is linked solidly with the drive shaft 21 of the belt transmission 2. Also the turbine 13, which in its connections differs from the trilok converter, is linked via a spoked wheel 131, which has been inserted between the guide disk 14 and the pump impeller 12, with an inner shaft 17. This shaft 17 can be linked optionally via a brake 3 with the housing 5 or via a clutch 4 with the drive shaft 21 for the infinitely variable belt transmission 2. The clutch 4 and the brake 3 can, at the same time, be arranged axially one behind the other between the hydrodynamic unit 1 and the belt transmission 2 (FIGS. 1 and 2), or on the other side of this transmission 20 (FIG. 3). A torque transmitter 9 arranged in the drive shaft 21.

In FIG. 2, the arrangement of the pump impeller 120 and the turbine impeller 130 has been interchanged in the hydrodynamic unit 10, so that the link between the turbine impeller 130 and the inner shaft 170 is developed more favorably. The guide disk 14A is, at the same time, linked via a one-way clutch 15 (overrunning device) with the drive shaft 22 for the loop transmission 2, and the inner disks of the clutch 3 and the brake 4 are arranged on a joint disk carrier 31/41, while for instance the inner disks of the brake and the outer disks of the clutch can be arranged on a joint disk carrier. In FIG. 3, the guide disk 14B is linkable with the drive shaft 23 for the belt transmission 20 via a clutch 16, and the clutch 40 and the brake 30 are arranged axially on the other side of the belt transmission.

In the schematic drawing of the tripartite hydrodynamic unit according to FIG. 4, the turbine 130A has a reduced and the guide disk 140A an enlarged radius proportion. The below-given sequence of operations is effected by a controller shown in FIG. 1 and constituting control means connected to the brake 5 and both clutches 4 and 11.

When starting, the belt transmission 2, 20 is set to its highest speed ratio, and for forward start driving the transmission primary shaft 7 is linked only with the pump impeller 12, 12A 120, 120A and the turbine 13, 13A, 130, 130A and the guide disk 14, 14A, 14B, 140 are linked via the clutch 4, 40 with the drive shaft 21, 22, 23 for the mechanical, infinitely variable transmission 2, 20. Due to its linkage, which can either be solid or via a clutch 16 or a single-way clutch 15, the guide disk 14 acts, at the same time, as a second turbine.

If the driving motor operates at a relatively low speed, the transmission primary shaft 7 is linked during forward driving via the bridging clutch 11, 110 and the dampener 6, which acts in the circumferential direction, directly with the drive shaft 21, 22, 23 for the mechanical, infinitely variable transmission 2, 20. The hydrodynamic unit is thus not effective and its elements rotate as a group. The adaptation to speed ratio and engine torque thus ensues exclusively via the mechanical, infinitely variable transmission.

In the reverse starting as well as driving range the transmission primary shaft 7 is linked only with the pump impeller 12 and the guide disk 14 with the drive shaft 21 for the mechanical, infinitely variable transmission 2. The turbine impeller is retained against rotation via the engaged brake 3 on the housing 5, so that the guide disk acts as turbine impeller and the turbine impeller as guide disk.

If the bridging clutch 11, 110 is additionally linked with the reverse shift arrangement, the guide disk and pump impeller rotate jointly and act in connection with the retained turbine impeller as a non-wearing hydrodynamic brake.

The following table shows the engaged clutches and brakes during each operating status.

|  | Clutch 4 | Brake 3 | Bridging Clutch 11, 110 | Single-way Clutch 15 |
| --- | --- | --- | --- | --- |
| Forward start driving | X |  |  |  |
| Forward driving | X |  | X |  |
| Reverse start driving and driving |  | X |  | X |
| Non-wearing braking |  | X | X | X |

= can be engaged, but is not essential.

Due to the stable linkage of the guide disk or support with a single-way clutch 15, in contrast to a possibly opened clutch 16 in the forward start driving and driving range, only the power input characteristics will be modified.

What is claimed is:

1. An infinitely variable compound transmission comprising:
    a tripartite hydrodynamic torque converter having a pump, a turbine member and a guide member relatively rotatable about a common axis;
    an input pump shaft connected to the pump, extending along the axis, and normally driven by an engine;
    a guide shaft connected to the guide member and coaxial with the pump shaft;
    a turbine shaft coaxial with the guide and pump shafts and connected to the turbine member;
    a brake connected to the turbine shaft, energizable for immobilizing the turbine shaft against rotation;
    a coupling clutch connected between the turbine shaft and the guide shaft and actuatable for joint rotation of same about the axis;
    a bypass clutch actuatable for connecting the pump shaft to one of the members;
    an infinitely variable belt transmission operatively connected to the guide shaft and having an output shaft connectable to a load; and
    control means connected to the brake and to both clutches and including a synchronizing mechanism connected to both clutches for,
        in a starting position, actuating the coupling clutch only with the brake and bypass clutch unactuated for driving the turbine and guide shafts purely hydraulically,
        in a forward drive position, actuating both the bypass and coupling clutches with the brake unactuated for positively coupling the guide shaft and the shaft of the one member, and
        in a reverse-starting and -drive position, actuating the brake with the clutches both unactuated for reverse driving the guide shaft purely hydraulically.

2. The infinitely variable compound transmission defined in claim 1, further comprising
    a one-way clutch interposed between the guide member and the guide shaft.

3. The infinitely variable compound transmission defined in claim 1, further comprising
    an actuatable clutch interposed between the guide member and the guide shaft and operated by the control means.

4. The infinitely variable compound transmission defined in claim 1 wherein the clutches are jaw clutches.

5. The infinitely variable compound transmission defined in claim 1 wherein the brake is a jaw brake.

6. The infinitely variable compound transmission defined in claim 1, further comprising
    a circumferentially effective damper between the bypass clutch and the one of the members.

7. The infinitely variable compound transmission defined in claim 1 wherein the turbine member is provided with a wheel extending between the guide member and the pump and connecting the turbine member to the turbine shaft.

8. The infinitely variable compound transmission defined in claim 1 wherein the turbine member and the pump are symmetrically dimensioned impellers.

9. The infinitely variable compound transmission defined in claim 1 wherein the members have radius proportions such that during forward and reverse drive, the same torque is obtained.

10. The infinitely variable compound transmission defined in claim 1 wherein the pump shaft is permanently and fixedly rotationally connected to the input shaft.

* * * * *